(12) United States Patent
Takagi et al.

(10) Patent No.: US 11,170,923 B2
(45) Date of Patent: Nov. 9, 2021

(54) MAGNET STRUCTURE, METHOD OF MANUFACTURING MAGNET STRUCTURE, AND MOTOR

(71) Applicant: TDK Corporation, Tokyo (JP)

(72) Inventors: Nobuo Takagi, Tokyo (JP); Yousuke Hitomi, Tokyo (JP)

(73) Assignee: TDK Corporation, Tokyo (JP)

( * ) Notice: Subject to any disclaimer, the term of this patent is extended or adjusted under 35 U.S.C. 154(b) by 49 days.

(21) Appl. No.: 16/830,942

(22) Filed: Mar. 26, 2020

(65) Prior Publication Data

US 2020/0312508 A1 Oct. 1, 2020

(30) Foreign Application Priority Data

Apr. 1, 2019 (JP) .............................. JP2019-069958

(51) Int. Cl.
*H01F 7/02* (2006.01)
*H02K 15/03* (2006.01)
*H02K 1/27* (2006.01)

(52) U.S. Cl.
CPC ........... *H01F 7/0221* (2013.01); *H01F 7/021* (2013.01); *H02K 15/03* (2013.01); *H02K 1/27* (2013.01)

(58) Field of Classification Search
CPC ...... H01F 7/0221; H01F 7/021; H01F 1/0577; H02K 15/03; H02K 1/27; H02K 21/16; H02K 1/276; H02K 1/2706; H02K 1/28; H02K 1/04; H02K 2213/03
See application file for complete search history.

(56) References Cited

FOREIGN PATENT DOCUMENTS

| JP | 2002272033 A | * | 9/2002 | ............. H02K 15/03 |
| JP | 2006-179830 A | | 7/2006 | |

OTHER PUBLICATIONS ip.com search results.*

* cited by examiner

*Primary Examiner* — Mohamad A Musleh
(74) *Attorney, Agent, or Firm* — Faegre Drinker Biddle & Reath LLP

(57) ABSTRACT

A magnet structure, comprises: a plurality of permanent magnet members; and an adhesive layer bonding the permanent magnet members to each other, wherein the adhesive layer contains an adhesive, and a plurality of gap members, the gap members have insulation properties, each surface S of the permanent magnet members in contact with the adhesive layer has a plurality of convex parts, a reference plane is a plane including a mean line of a roughness curve of the surface S, Ry is a maximum value of heights of the convex parts from a deepest part of the surface S in a direction perpendicular to the reference plane, Rv is a distance between the reference plane and the deepest part, Rp is Ry−Rv, W1 is a width of the gap member in a direction perpendicular to the reference plane, and W1 is larger than 2Rp.

7 Claims, 7 Drawing Sheets

MAGNET STRUCTURE, METHOD OF MANUFACTURING MAGNET STRUCTURE, AND MOTOR

TECHNICAL FIELD

The present invention relates to a magnet structure, a method of manufacturing the magnet structure, and a motor.

BACKGROUND

A permanent magnet, such as a rare-earth magnet, is used as a component of a motor. A motor comprising a permanent magnet is mounted on, for example, a hybrid vehicle, an electric vehicle, or a hard disk drive.

A change in magnetic field accompanied by rotation of a motor causes eddy currents in a permanent magnet. By Joule heating due to eddy currents, the electric power is dissipated, and the motor efficiency is reduced. That is, eddy current losses are caused. Furthermore, by Joule heating due to eddy currents, the permanent magnet is demagnetized. For these reasons, suppression of eddy currents in the permanent magnet is desirable in order to improve the performance of the motor. As described in Japanese Unexamined Patent Publication No. 2006-179830, a permanent magnet is divided into a plurality of permanent magnet members, and the permanent magnet members are bonded to each other with adhesive layers, thereby suppressing eddy currents flowing between the permanent magnet members. That is, the permanent magnet members are insulated from each other, and therefore the paths of eddy currents flowing between the permanent magnet members are disconnected.

SUMMARY

In a macro scale (for example, a scale of millimeters), the surface of a permanent magnet member is flat. However, in a micro scale (for example, a scale of micrometers), the surface of the permanent magnet member is not flat. That is, in the micro scale, many convex parts are formed on the surface of the permanent magnet member. Accordingly, the thinner an adhesive layer disposed between a pair of permanent magnet members is, the more easily the convex parts of the surfaces of the facing permanent magnet members come into contact with each other. The pair of convex parts in contact with each other functions as a conductive path between the permanent magnet members. As a result, through the pair of convex parts, eddy currents flow between the permanent magnet members. The thinner the adhesive layer is, the more easily eddy currents flow between the permanent magnet members according to the mechanism described above. However, the adhesive layer per se does not have any magnetic force. Accordingly, in order to improve the performance of the motor, it is desirable to make the adhesive layer thinner.

An object of the present invention, which has been made in view of the situations described above, is to provide a magnet structure that suppresses conduction between permanent magnet members, a method of manufacturing the magnet structure, and a motor comprising the magnet structure.

A magnet structure according to an aspect of the present invention comprises: a plurality of permanent magnet members; and an adhesive layer bonding the permanent magnet members to each other; wherein the adhesive layer contains an adhesive, and a plurality of gap members, the gap members have insulation properties (electrical insulating quality), each surface S of the permanent magnet members in contact with the adhesive layer has a plurality of convex parts (protrusions), a reference plane is a plane including a mean line (average line) of a roughness curve of the surface S, Ry is a maximum value of heights of the convex parts from a deepest part of the surface S in a direction perpendicular to the reference plane, Rv is a distance between the reference plane and the deepest part, Rp is Ry−Rv, W1 is a width of the gap member in a direction perpendicular to the reference plane, and W1 is larger than 2Rp.

D is the particle diameter of magnetic particles contained in the permanent magnet member, and W1 may be larger than (2Rp+D).

W2 is a width of the gap member in a direction parallel to the reference plane, and the adhesive layer may contain the gap members having W1 larger than W2.

The number of gap members having W1 larger than W2 may be n, the total number of gap members is N, and n/N is 3% or more and 50% or less.

The gap members may be glass beads.

A method of manufacturing a magnet structure according to an aspect of the present invention is a method of manufacturing the magnet structure described above, the method comprising: a step of forming a coating film containing the adhesive being uncured, and the gap members, on the surface S of the permanent magnet member; a step of breaking the gap members by pressurizing the coating film intervening (held) between a pair of the permanent magnet members; and a step of forming the adhesive layer by curing the coating film containing the broken gap members.

A motor according to an aspect of the present invention comprises a rotor, and a stator, wherein the rotor has a plurality of the magnet structures.

According to the present invention, a magnet structure that suppresses conduction between the permanent magnet members, a method of manufacturing the magnet structure, and a motor comprising the magnet structures.

DETAILED DESCRIPTION

Figure 1:
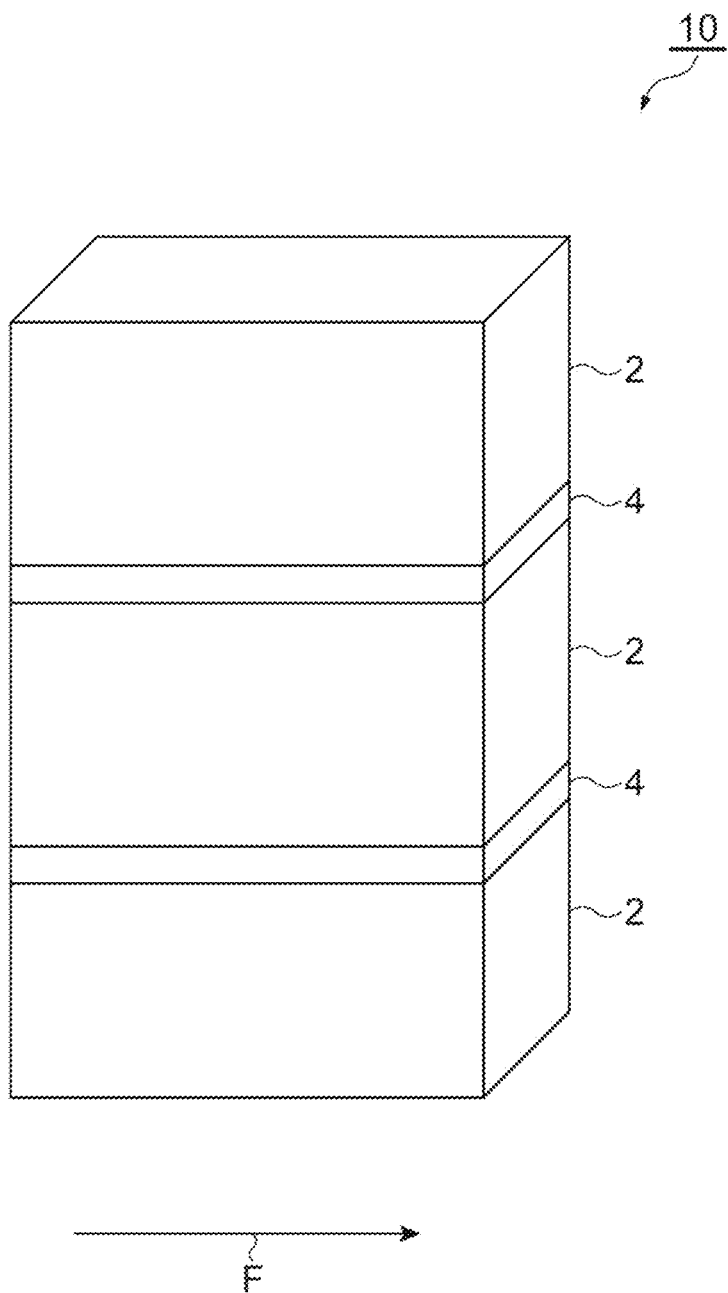
FIG. 1 is a perspective view of a magnet structure.

Hereinafter, referring to the drawings, preferred embodiments of the present invention are described. In the drawings, equivalent configuration elements are assigned equivalent symbols. The present invention is not limited to the embodiments described below.

(Magnet Structure)

Figure 2:
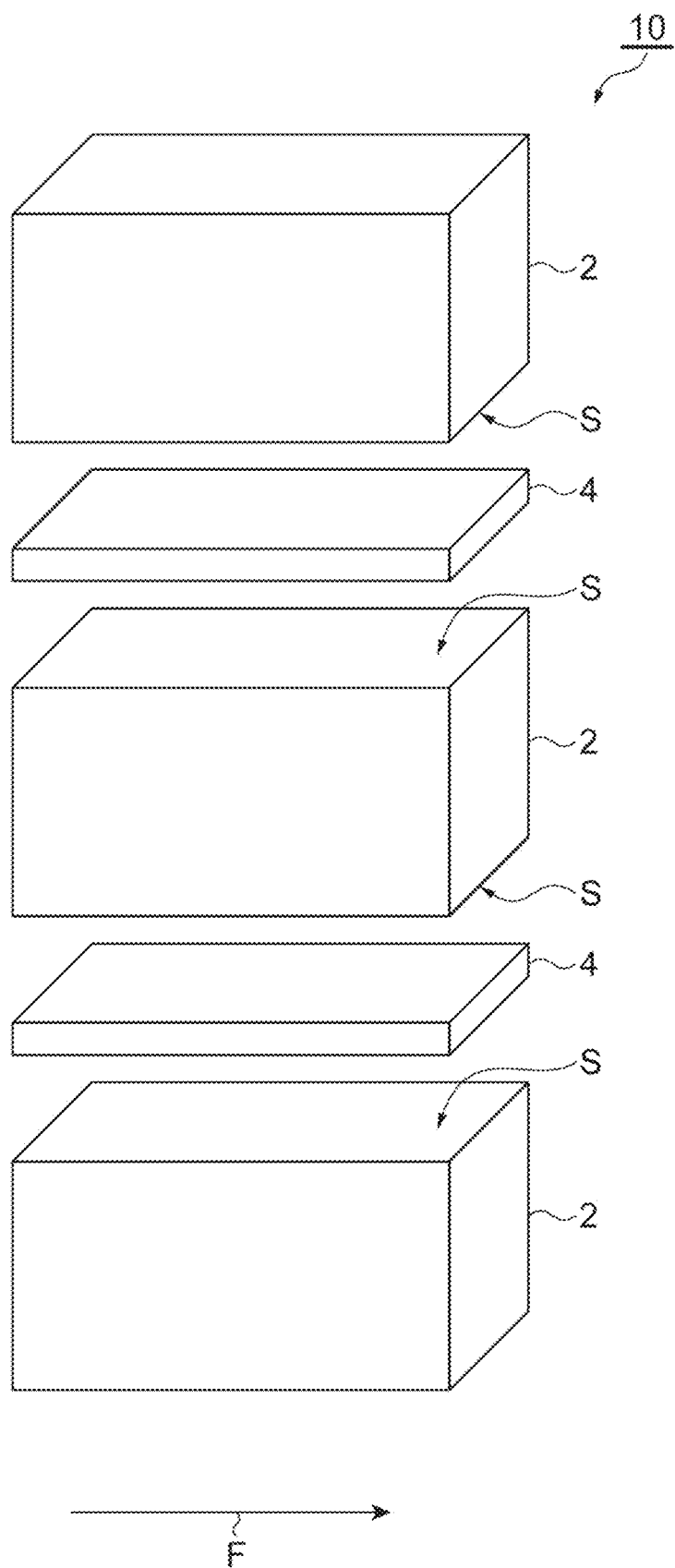
FIG. 2 is an exploded view of the magnet structure shown in FIG. 1.

As shown in FIGS. 1 and 2, a magnet structure 10 comprises a plurality of permanent magnet members 2, and adhesive layers 4 that bond the permanent magnet members 2 to each other. The adhesive layer 4 contains an adhesive, and a plurality of gap members. Each gap member has insulation properties. Each gap member may be a particle. The shape of each gap member may be, for example, a sphere, a column, a cone, or a polyhedron.

As shown in FIGS. 1 and 2, the magnet structure 10 and the permanent magnet members 2 may each be a rectangular parallelepiped. The dimensions and the shape of each of the permanent magnet members 2 may be the same. However, the shapes and dimensions of the magnet structure 10 and each of the permanent magnet members 2 are not limited. The magnet structure 10 may comprise a plurality of permanent magnet members 2 that are different in shape and dimensions from each other. The adhesive layer 4 may cover the entire surface S of a permanent magnet member 2. The adhesive layer 4 may cover only a part of the surface S of a permanent magnet member 2. The adhesive layer 4 may cover the surfaces of a plurality of permanent magnet members 2. The number of permanent magnet members 2 is not limited.

Figure 3:
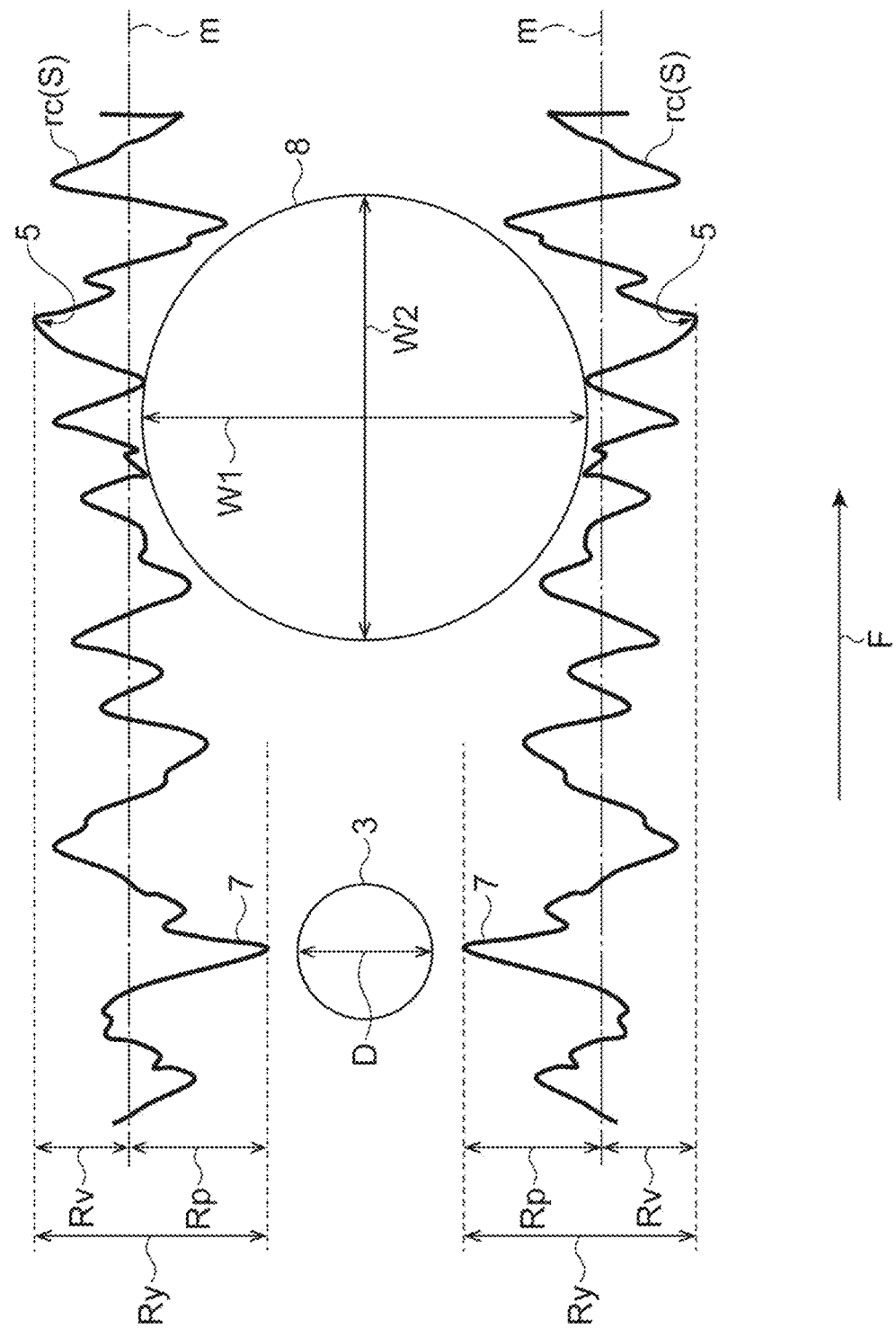
FIG. 3 is a schematic view of a section of permanent magnet members and an adhesive layer, the section being perpendicular to a surface of the permanent magnet member, the surface being in contact with the adhesive layer.

As shown in FIGS. 1 and 2, in a macro scale (for example, a scale of millimeters), the surface S of each permanent magnet member 2 is flat. On the other hand, FIG. 3 shows a section of each of the permanent magnet members 2 and the adhesive layers 4 in a micro scale (for example, a scale of micrometers). In the macro scale, the section shown in FIG. 3 is perpendicular to the surface S of the permanent magnet member 2 in contact with the adhesive layer 4. As shown in FIG. 3, in the micro scale, the surface S of the permanent magnet member 2 is not flat. In the micro scale, the surface S of the permanent magnet member in contact with the adhesive layer 4 has a plurality of convex parts 7. The roughness curve rc of each surface S shown in FIG. 3 has a concavo-convex shape (irregularity shape) of the surface S of the permanent magnet member 2. The interval between surfaces S of a pair of permanent magnet members 2 facing each other correspond to an adhesive layer 4. That is, the interval of a pair of roughness curves rc corresponds to the adhesive layer 4.

A reference plane m is a plane including the mean line of the roughness curve rc of the surface S. In the two-dimensional section shown in FIG. 3, the reference plane m is the mean line itself of the roughness curve rc of the surface S. The mean line of the roughness curve rc may be a straight line calculated from the roughness curve rc through the least-square method. The reference plane m may be a flat plane. Ry is the maximum value of the height of the convex parts 7 from the deepest part 5 of the surface S in the direction perpendicular to the reference plane m. Rv is the distance between the reference plane m and the deepest part 5. Rp is Ry−Rv. W1 is the width (maximum width) of the gap member 8 in the direction perpendicular to the reference plane m. W2 is the width (maximum width) of the gap member 8 in the direction parallel to the reference plane m. The direction perpendicular to the reference plane m is the direction perpendicular to the surface S of the permanent magnet member 2 in the macro scale. The direction parallel to the reference plane m is the direction parallel to the surface S of the permanent magnet member 2 in the macro scale. In other words, the direction parallel to the reference plane m may be a direction in which the adhesive layer 4 extends.

W1 is larger than 2Rp. If W1 is equal to or less than 2Rp, the convex parts 7 formed on the facing surfaces S are likely to come into contact with each other. The pair of convex parts 7 in contact with each other functions as a conductive path between the permanent magnet members 2. As a result, through the pair of convex parts 7, eddy currents flow between the permanent magnet members 2. However, since W1 is larger than 2Rp, the convex parts 7 formed on the facing surfaces S are hard to contact with each other. As a result, conduction between the permanent magnet members 2 is suppressed, and eddy currents flowing between the permanent magnet members 2 are suppressed. For the same reason, the mean value of W1 of the gap members 8 may be larger than 2Rp. As described above, the gap member 8 has a function as that of an insulation material and a spacer.

Ry may be, for example, 1 μm or more and 70 μm or less. Rv may be, for example, 1 μm or more and 20 μm or less. Rp may be, for example, 1 μm or more and 50 μm or less. W1 may be, for example, 5 μm or more and 115 μm or less, or from 5 μm or more and 100 μm or less. The mean value of the thickness T of the adhesive layer may be, for example, 10 μm or more and 115 μm or less, 10 μm or more and 100 μm or less, or 10 μm or more and 50 μm or less. The roughness curve rc of the surface S, the mean line of the roughness curve rc (reference plane m), Ry, Rv, and Rp may be measured by a method based on JIS B 0601-2001 or ISO 4287-1997. The maximum height based on such standards corresponds to Ry. A reference length L based on which the roughness curve rc, the reference plane m, Ry, Rv, and Rp are measured may be, for example, 0.1 mm or more and 10 mm or less. In other words, the reference length L may be the length of the roughness curve rc in the direction parallel to the reference plane m. The roughness curve rc, the mean line (reference plane m) thereof, Ry, Rv and Rp may be measured on the surface S of each permanent magnet member 2 before being covered by the adhesive layer 4. The roughness curve rc, the mean line (reference plane m) thereof, Ry, Rv and Rp may be measured on a section as show in FIG. 3. Ry, Rv and Rp may be controlled by the particle diameters of magnetic powder used to manufacture the permanent magnet members, manufacturing conditions for the permanent magnet members, or processing of the surfaces of the permanent magnet members. The manufacturing conditions may be, for example, various conditions for a step of sintering magnetic powder. The processing of the surface may be, for example, polishing, etching, or cleaning. All the permanent magnet members 2 constituting the magnet structure 10 may be manufactured by the same manufacturing method. Ry, Rv and Rp may be common to all the permanent magnet members 2.

W1 may be larger than (2Rp+D). D is the particle diameter (longer diameter) of a magnetic particle 3 contained in the permanent magnet member 2. In a process of manufacturing the magnet structure 10, there is a possibility that the magnetic particle 3 falls off the surface S of the permanent magnet member 2 and is mixed in the adhesive layer 4. Even if the surface S of the permanent magnet member 2 were covered with a plating film or a resin film, the magnetic particle 3 would be likely to fall off through a pinhole formed on the surface S accompanied by cleaning of the surface S (for example, ultrasonic cleaning). Even if cleaning of the surface S were repeated, it would be difficult to prevent completely the magnetic particle 3 from falling off the surface S, and the adhesive layer 4 would contain the magnetic particle 3. Even if the convex parts 7 formed on the facing surfaces S were not directly in contact with each other, a pair of permanent magnet members 2 would be electrically connected to each other owing to intervention of the magnetic particle 3 between a pair of convex parts 7. However, if W1 is larger than (2Rp+D), the magnetic particle 3 is hard to coming into contact with the pair of convex parts 7 even with the magnetic particle 3 intervening between the pair of the convex parts 7. Consequently, the fact that W1 is larger than (2Rp+D) prevents conduction between the permanent magnet members 2 via the magnetic particle 3.

D may be the mean value of particle diameters of a plurality of magnetic particles 3 contained in the permanent magnet member 2. D may be the mean value of the particle diameters of a plurality of magnetic particles 3 arbitrarily selected from a section of the permanent magnet member 2. The particle diameter of each magnetic particle 3 may be measured by observing the section of the permanent magnet member 2 through a scanning electron microscope (SEM). D may be, for example, 3.5 μm or more and 15 μm or less.

Figure 4A:
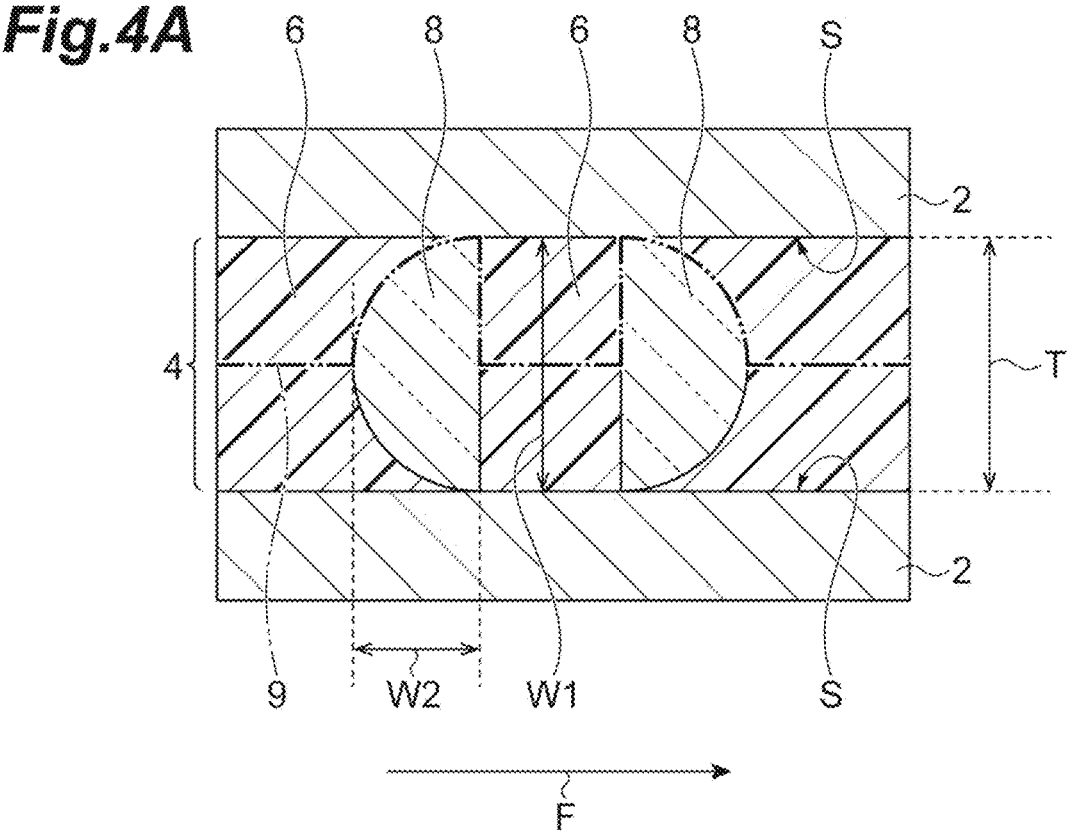
FIG. 4A is a sectional view of the permanent magnet members and the adhesive layer, the section perpendicular to the surfaces of the permanent magnet members, the surfaces being in contact with the adhesive layer.
Figure 4B:
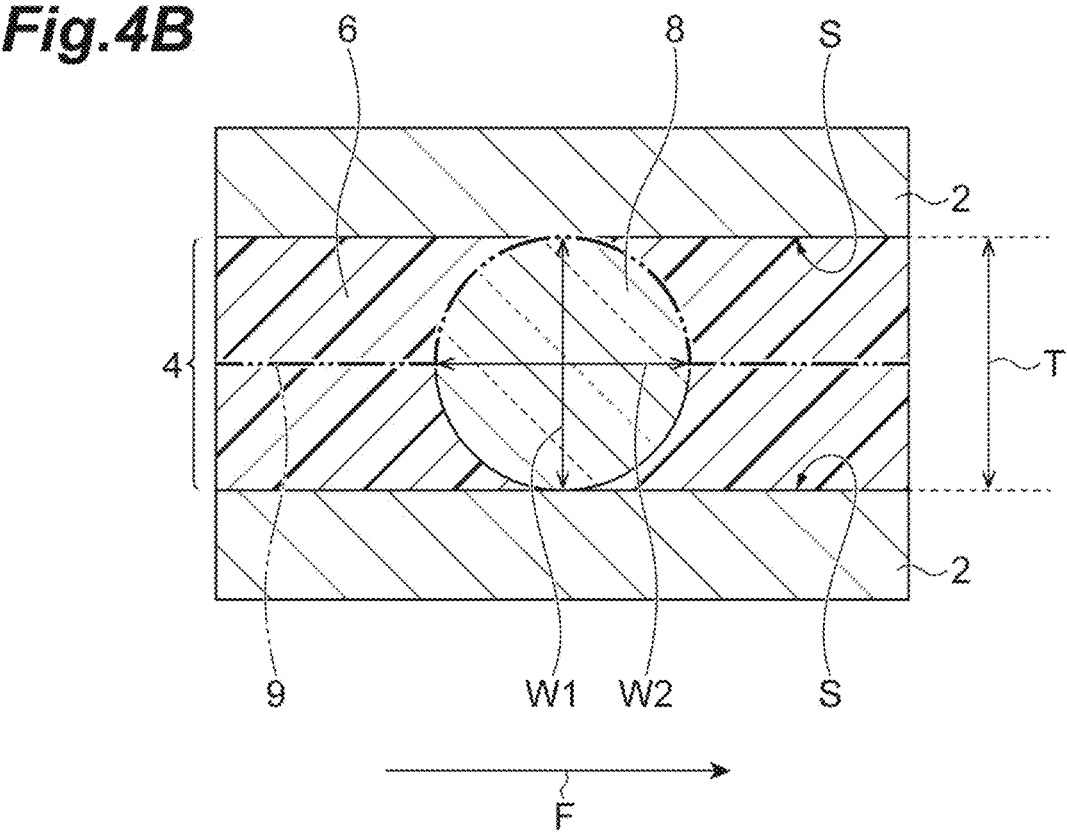
FIG. 4B is another sectional view of the permanent magnet members and the adhesive layer, the section perpendicular to the surfaces of the permanent magnet members, the surfaces being in contact with the adhesive layer.
Figure 5A:
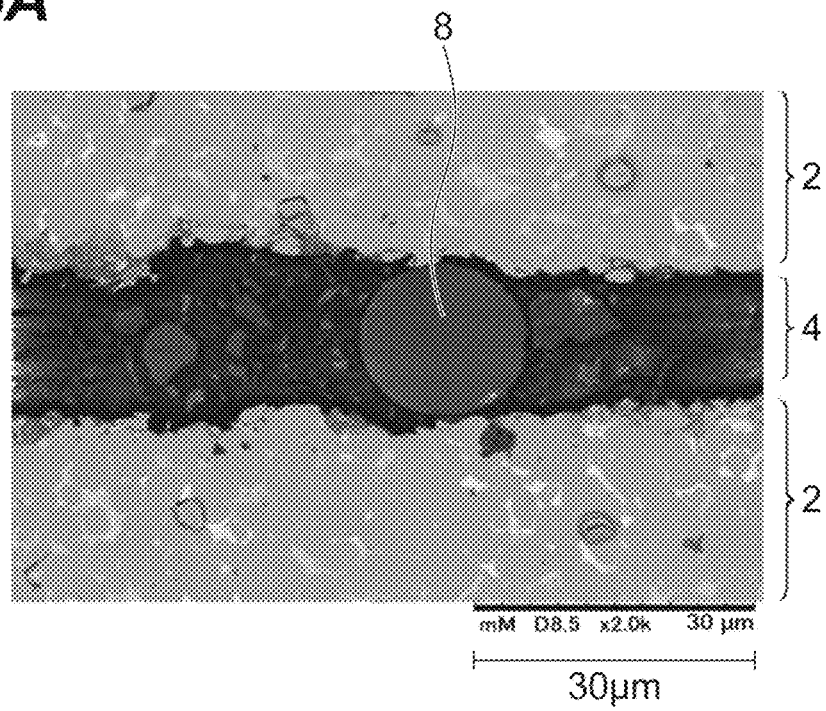
FIG. 5A is a backscattered electron image of a section of the permanent magnet members and the adhesive layer, the section perpendicular to the surfaces of the permanent magnet members, the surfaces being in contact with the adhesive layer.
Figure 5B:
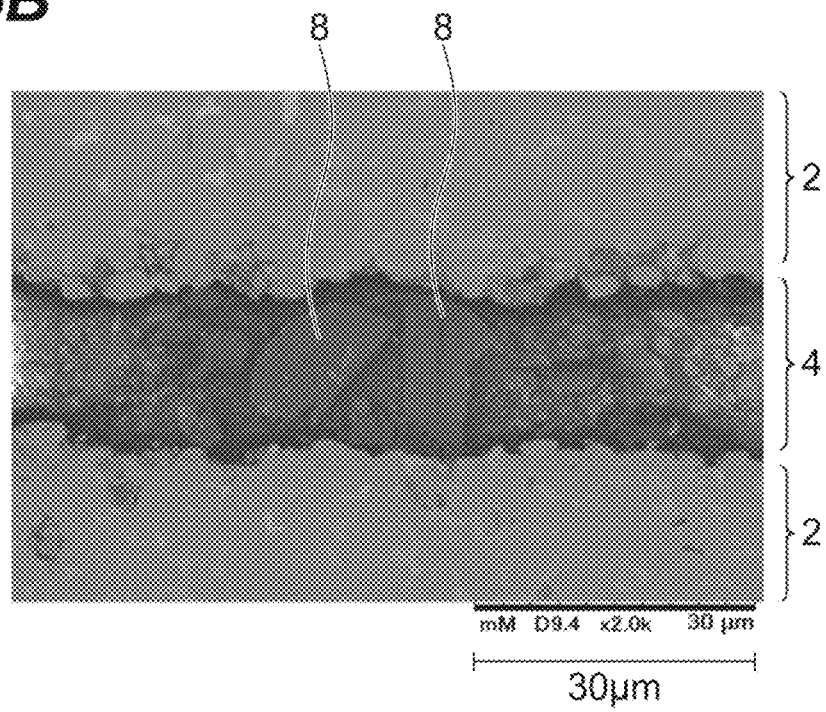
FIG. 5B is a backscattered electron image of another section of the permanent magnet members and the adhesive layer, the section perpendicular to the surfaces of the permanent magnet members, the surfaces being in contact with the adhesive layer.
Figure 6A:
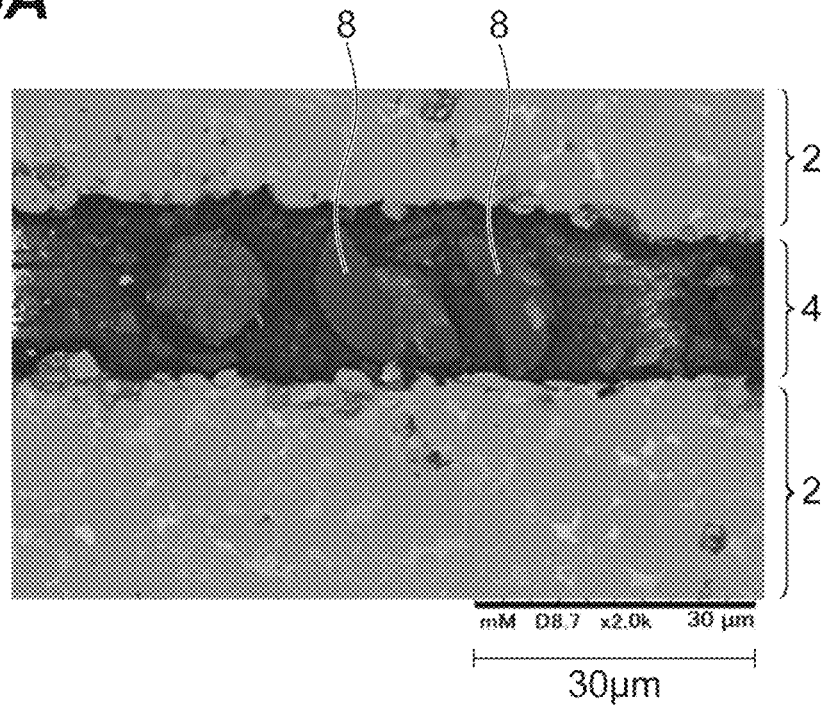
FIG. 6A is a backscattered electron image of a section of the permanent magnet members and the adhesive layer, the section perpendicular to the surfaces of the permanent magnet members, the surfaces being in contact with the adhesive layer.
Figure 6B:
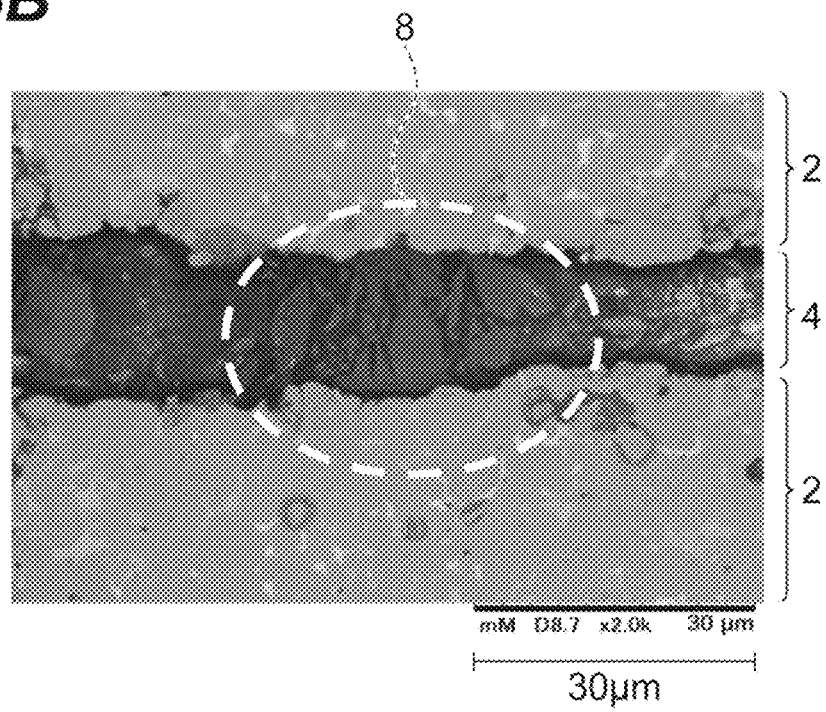
FIG. 6B is a backscattered electron image of another section of the permanent magnet members and the adhesive layer, the section perpendicular to the surfaces of the permanent magnet members, the surfaces being in contact with the adhesive layer.

As shown in FIG. 4A, the adhesive layer 4 may contain gap members 8 having W1 larger than W2. The gap member 8 having W1 larger than W2 may be, for example, a half-spherical-shaped gap member. In other words, the gap member 8 having W1 larger than W2 may be a flat gap member 8. Some gap members 8 among all the gap members 8 contained in the adhesive layer 4 may be flat gap members. The ratio of adhesive 6 in the adhesive layer 4 decreases accompanied by inclusion of the gap members 8. Accordingly, the mechanical strength of the adhesive layer 4 decreases accompanied by inclusion of the gap members 8. For example, if a shear force is applied to the adhesive layer 4 in a direction F in which the adhesive layer 4 extends, the adhesive layer 4 is likely to fracture along a fracture path 9 that includes the boundary between the gap member 8 and the adhesive 6. The longer the fracture path 9 is, the more the reduction in the mechanical strength of the adhesive layer 4 is suppressed. As evidenced by comparison between FIGS. 4A and 4B, the fracture path 9 around the flat gap member 8 is likely to be bent. The fracture path 9 around the flat gap member 8 is longer than the fracture path 9 around the spherical gap member 8. Accordingly, by including flat gap members 8 in addition to spherical gap members 8 in the adhesive layer 4, reduction in the mechanical strength of the adhesive layer 4 can be suppressed. A backscattered electron image of the adhesive layer 4 containing the flat gap members 8 are shown in FIGS. 5B, 6A and 6B. The backscattered electron image of the adhesive layer 4 containing spherical gap members 8 is shown in FIG. 5A. Each backscattered electron image is an image taken by an SEM.

The number of gap members 8 having W1 larger than W2 is n. The total number of gap members 8 is N. n/N may be 3% or more and 50% or less. Since the gap members 8 are many particles, the shapes and dimensions of the gap members 8 are not uniform, and the gap members 8 have a predetermined particle size distribution. As described later, by applying a predetermined pressure to a coating film containing a plurality of gap members 8, the gap members 8 having relatively large particle diameters are likely to be divided into a plurality of flat gap members 8. As a result, at the time of completion of the magnet structure 10, n/N is likely to be 3% or more and 50% or less. In a case where the number of gap members 8 having W1 larger than 2Rp is represented as n', n'/N may be more than 50% and less than 97%. In a case where n/N and n'/N is within the range described above, conduction between the permanent magnet members 2 is likely to be suppressed, and reduction in the mechanical strength of the adhesive layer 4 accompanied by inclusion of the gap members 8 is likely to be suppressed.

The gap members 8 may be glass beads. The glass beads are excellent in insulation, and hard to being deformed even at a high temperature (for example, 180° C.). The glass beads tend to be broken by being pressurized, and tend to be divided into a plurality of flat gap members 8. For these reasons, the glass beads are suitable for gap members 8. Note that the composition of the gap members 8 is not limited. The gap members 8 may be, for example, ceramic beads, resin beads, or metal beads. Since the thermal expansion coefficient of resin beads is relatively high, the effect of the resin beads on the adhesion strength is small. The entire surface of the metal bead is covered with an insulation film. By surface treatment, such as phosphate conversion coating treatment, the entire surface of the metal bead can be covered with an insulation film. The adhesive layer 4 may contain multiple types of gap members 8 having different compositions. The adhesive layer 4 may contain multiple types of gap members 8 having different shapes. The contained amount of gap members 8 in the adhesive layer 4 may be, for example, 1 percent by mass or more and 40 percent by mass or less.

The adhesive 6 may contain resin, hardener (curing agent), hardening accelerator (curing accelerator), diluent (organic solvent), colorant, filler, coupling agent, antifoamer, flame retardant, etc. A part of or the entire resin may be a thermosetting resin. The resin contained in the adhesive layer 4 may be, for example, of at least a type selected from the group consisting of epoxy resin, phenol resin, melamine resin, urea resin, unsaturated polyester resin, alkyd resin, polyurethane resin, polyimide resin, silicon resin, cyanoacrylate resin, modified acrylic resin, and diallyl phthalate resin. The adhesive layer 4 may contain multiple types of resins. The hardener may be, for example, acid anhydride series hardener, dicyandiamide (DICY) series hardener, or aromatic amine series hardener. The hardening accelerator may be, for example, imidazole series hardening accelerator, or tertiary amine series hardening accelerator. The diluent may be, for example, reactive diluent or non-reactive diluent. The colorant may be, for example, organic colorant, or inorganic colorant (white titanic oxide, etc.). The filler may be, for example, silica, calcium carbonate, aluminum hydroxide, talc, alumina, or barium sulfate. The filler may be gap members 8.

The permanent magnet members 2 may be, for example, sintered magnets or hot-deformed magnets. The permanent magnet members 2 may be rare-earth magnets, Al—Ni—Co alloy magnets (alnico magnets), or Fe—Cr—Co alloy magnets The main phase of the rare-earth magnet may be, for example, $Nd_2Fe_{14}B$, $SmCo_5$, $Sm_2Co_{17}$, $Sm_2Fe_{17}N_3$, $Sm_1Fe_7N_x$ or $PrCo_5$.

A method of manufacturing the magnet structure 10 according to this embodiment, comprises: a step of forming a coating film containing the uncured adhesive 6, and the gap members 8, on the surface S of the permanent magnet member 2; a step of breaking at least some of the gap members 8 by pressurizing the coating film intervening between a pair of the permanent magnet members 2; and a step of forming the adhesive layer 4 by curing the coating film containing the broken gap members 8.

The coating film may be formed by applying slurry on the surface S of the permanent magnet member 2. The slurry may be a mixture of the uncured adhesive 6, the gap members 8 and an organic solvent. The slurry application means may be, for example, screen printing, an applicator, a doctor blade, a bar coater, or a die coater. Before clumping the coating film by the pair of permanent magnet members 2, the organic solvent may be removed by drying the coating film. The organic solvent may be, for example, of at least a type selected from the group consisting of acetone, methyl ethyl ketone, methyl isobutyl ketone, benzene, toluene, carbitol acetate, butyl carbitol acetate, cyclohexanone, and xylene.

On the coating film formed on the surface S of the permanent magnet member 2, another permanent magnet member 2 is arranged. The gap members 8 in the coating film are broken by pressurizing the coating film intervening between the pair of the permanent magnet members 2. For example, a spherical gap member 8 is divided into a plurality of flat gap members 8. By pressurizing the coating film, some of all the gap members 8 may be broken. The pressure applied to the coating film may be adjusted according to the particle diameters and hardness of the gap members 8. The pressure applied to the coating film containing the gap member 8 may be, for example, 3 MPa or more and 8 MPa or less.

The coating film containing the broken gap members 8 may be cured by being heated. The curing temperature and the heating time period may be appropriately adjusted according to the composition of the resin contained in the coating film, the thickness of the resin and the like. For example, if the coating film contains epoxy resin, the curing temperature may be about 180° C., and the heating time period may be about an hour.

By the method described above, the permanent magnet members 2 are bonded to each other with the adhesive layer 4, and the magnet structure 10 is completed.

(Motor)

Figure 7:
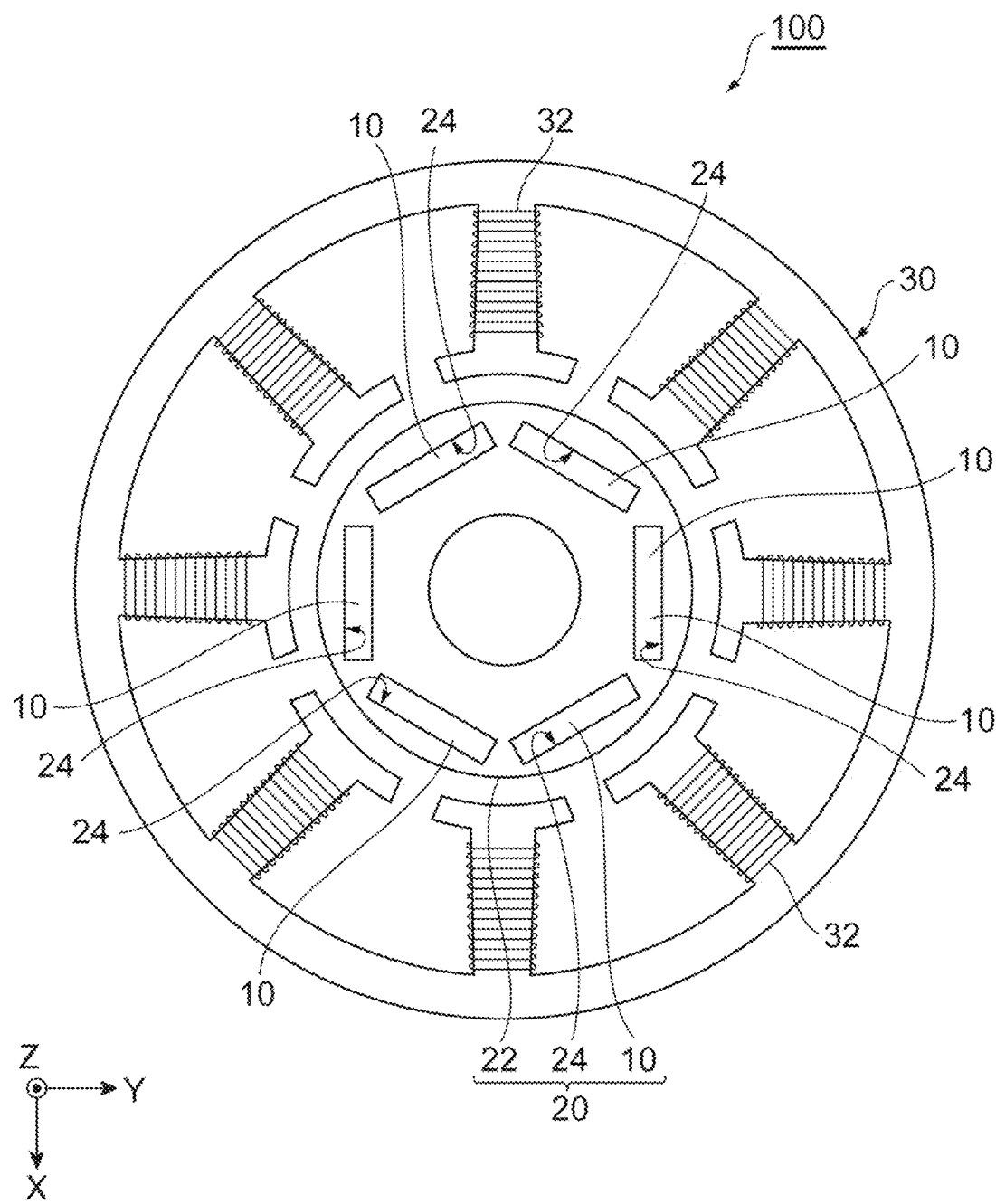
FIG. 7 shows an internal structure of a motor that comprises magnet structures.

As shown in FIG. 7, the magnet structure 10 according to this embodiment may be used in a motor 100. The motor 100 shown in FIG. 7 is an IPM motor (Interior Permanent Magnet Motor). The motor 100 comprises a cylindrical rotor 20 (rotor member), and a stator 30 (stator member) arranged outside of the rotor 20 in such a way as to surround the rotor 20. FIG. 7 shows an internal structure of the motor 100 in the rotation axis direction of the rotor 20 (Z direction). The rotor 20 comprises a cylindrical rotor core 22, and a plurality of magnet structures 10. Along the outer peripheral surface of the rotor core 22, a plurality of accommodation holes 24 are formed at predetermined intervals, and the magnet structures 10 are accommodated in the respective accommodation holes 24. That is, the magnet structures 10 are arranged along the peripheral surface of the rotor core 22. The magnet structures 10 are fixed into the respective accommodation holes 24 by resin molding. In resin molding, a high pressure is applied to the magnet structures 10. By the adhesive layer 4 containing the flat gap members 8, the breakage (fracture) of the adhesive layer 4 accompanied by resin molding is likely to be suppressed.

The magnet structures 10 adjacent to each other in the circumferential direction of the rotor 20 are stored in the respective accommodation holes 24 such that the positions of N-poles and S-poles can be opposite to each other. That is, the magnet structures 10 adjacent along the circumferential direction generate magnetic field lines in directions opposite to each other, along the radial directions of the rotor 20. Although the rotor 20 shown in FIG. 7 has six magnet structures 10, the number of (poles of) magnet structures 10 that the rotor 20 has is not limited.

The stator 30 has a plurality of coil parts 32 provided at predetermined intervals along the outer peripheral surface of the rotor 20. The coil parts 32 and the respective magnet structures 10 are arranged in such a way as to face each other. The stator 30 applies a torque to the rotor 20 by an electromagnetic action, and the rotor 20 rotates in the circumferential direction. Although the stator 30 shown in FIG. 7 has eight coil parts 32, the number of (slots of) the coil parts 32 that the stator 30 has is not limited.

Although the preferred embodiments of the present invention are described above, the present invention is not necessarily limited to the embodiments described above.

The motor is an SPM motor (Surface Permanent Magnet Motor). The motor is not limited to a permanent magnet synchronous motor, such as an IPM motor and an SPM motor. The motor may be a permanent magnet direct current motor, a linear synchronous motor, a voice coil motor, or a vibration motor.

The usage of the magnet structure according to this embodiment is not limited to the motor. The magnet structure may be applied to a generator, an actuator, etc. The magnet structure may be used in various fields encompassing a hybrid vehicle, an electric vehicle, a hard disk drive, a magnetic resonance imaging instrument (MRI), a smartphone, a digital camera, a thin screen TV, a scanner, an air-conditioner, a heat pump, a refrigerator, a vacuum cleaner, a washer-drier, an elevator, and an aerogenerator and the like.

INDUSTRIAL APPLICABILITY

The magnet structure according to the present invention is employed in an IPM motor, for example.

REFERENCE SIGNS LIST

2 . . . Permanent magnet member, 3 . . . Magnetic particle, 4 . . . Adhesive layer, 5 . . . Deepest part, 6 . . . Adhesive, 7 . . . Convex part, 8 . . . Gap member, 9 . . . Fracture path, 10 . . . Magnet structure, 20 . . . Rotor, 22 . . . Rotor core, 24 . . . Accommodation hole, 30 . . . Stator, 32 . . . Coil part, 100 . . . Motor, S . . . Surface of permanent magnet member in contact with adhesive layer, rc . . . Roughness curve, m . . . Reference plane, Ry . . . Maximum value of height of convex part from deepest part, Rv . . . Distance between reference plane and deepest part, Rp . . . Ry−Rv, W1 . . . Width of gap member in direction perpendicular to reference plane, W2 . . . Width of gap member in direction parallel to reference plane, D . . . Particle diameter of magnetic particle, F . . . Direction in which adhesive layer extends (shear force direction).

What is claimed is:

1. A magnet structure, comprising:
a plurality of permanent magnet members; and
an adhesive layer bonding the permanent magnet members to each other, wherein the adhesive layer contains an adhesive, and a plurality of gap members, the gap members have insulation properties, each surface S of the permanent magnet members in contact with the adhesive layer contains a plurality of convex parts, a reference plane is a plane including a mean line of a roughness curve of the surface S, Ry is a maximum value of heights of the convex parts from a deepest part of the surface S in a direction perpendicular to the reference plane, Rv is a distance between the reference plane and the deepest part, Rp is Ry−Rv, W1 is a width of the gap member in a direction perpendicular to the reference plane, and W1 is larger than 2Rp.

2. The magnet structure according to claim 1, wherein D is a particle diameter of magnetic particles contained in the permanent magnet member, and W1 is larger than (2Rp+D).

3. The magnet structure according to claim 1, wherein W2 is a width of the gap member in a direction parallel to the reference plane, and the adhesive layer contains the gap members having W1 larger than W2.

4. The magnet structure according to claim 1, wherein the number of gap members having W1 larger than W2 is n, the total number of gap members is N, and n/N is 3% or more and 50% or less.

5. The magnet structure according to claim 1, wherein the gap members are glass beads.

6. A method of manufacturing the magnet structure according to claim 1, comprising:

a step of forming a coating film containing the adhesive being uncured, and the gap members, on the surface S of the permanent magnet member, a step of breaking the gap members by pressurizing the coating film intervening between a pair of the permanent magnet members; and a step of forming the adhesive layer by curing the coating film containing the broken gap members.

7. A motor, comprising a rotor, and a stator, wherein the rotor has a plurality of the magnet structures according to claim 1.

* * * * *